United States Patent [19]

Berglund

[11] Patent Number: 5,465,282

[45] Date of Patent: Nov. 7, 1995

[54] FUEL ASSEMBLY FOR A NUCLEAR REACTOR

[75] Inventor: Pontus Berglund, Västerås, Sweden

[73] Assignee: ABB Atom AB, Västerås, Sweden

[21] Appl. No.: 340,888

[22] Filed: Nov. 15, 1994

[30] Foreign Application Priority Data

Nov. 25, 1993 [SE] Sweden ................... 9303925

[51] Int. Cl.$^6$ ................... G21C 3/30
[52] U.S. Cl. ................... 376/426; 376/446; 376/353; 376/449; 376/441; 376/436
[58] Field of Search ................... 376/426, 446, 376/353, 449, 441, 438; 976/DIG. 65, DIG. 68, DIG. 73

[56] References Cited

U.S. PATENT DOCUMENTS

| | | | |
|---|---|---|---|
| 4,064,004 | 12/1977 | Long et al. | 376/440 |
| 4,342,721 | 8/1982 | Pomie et al. | 376/298 |
| 4,684,500 | 8/1987 | Gjertsen et al. | 376/446 |
| 5,147,599 | 9/1992 | Mansson | 376/446 |

Primary Examiner—Donald P. Walsh
Assistant Examiner—Meena Chelliah
Attorney, Agent, or Firm—Watson, Cole, Grindle & Watson

[57] ABSTRACT

A fuel assembly for a nuclear reactor, comprising a number of parallel fuel rods which are retained by means of spacer grids, arranged along the fuel rods, as well as guide thimbles, wherein the guide thimbles are fixed to the spacer grids. The guide thimbles with associated fuel rods are further fixed between a top nozzle and a bottom nozzle. In the top nozzle, through-holes are arranged for connection to a top sleeve joined to the upper end of the respective guide thimble. In the top sleeve, a first locking element is arranged for cooperation with a second locking element arranged on a guide sleeve, which guide sleeve is insertable through that hole in the top nozzle which corresponds to the respective top sleeve. The locking elements are interlocked in connected position by means of a locking sleeve insertable into the guide sleeve. The locking sleeve comprises a third locking element in the form of a through-opening arranged in the wall, a corbelled-out portion being arranged in the edge of the opening. The opening imparts to the corbelled-out portion resilient properties. The corbelled-out portion is adapted, when the locking sleeve is inserted into the guide sleeve, to cooperate with a fourth locking element in the form of an annular slot arranged in the inner wall of the guide sleeve. (FIG. 2)

4 Claims, 2 Drawing Sheets

FUEL ASSEMBLY FOR A NUCLEAR REACTOR

TECHNICAL FIELD

The present invention relates to a fuel assembly to be arranged in a nuclear reactor where in the fuel assembly a removable top nozzle is arranged to make possible reconditioning of the fuel assembly.

BACKGROUND ART, PROBLEMS

A fuel assembly of a known design comprises a plurality of fuel rods and guide thimbles for control rods or for coolant flowing through. The fuel rods and the guide thimbles are retained in predetermined mutual positions by means of a plurality of spacer grids which are arranged at different levels along the fuel assembly. A top and a bottom nozzle are arranged at the respective ends of the fuel assembly for attachment of the guide thimbles. Attachment of the guide thimbles to the top and bottom nozzles is make possible since the guide thimbles extend somewhat outside the respective ends of the fuel rods. In Swedish patent 465 796 such a fuel assembly is described. According to the patent, the guide thimbles are provided at the top with a top sleeve which fits into a corresponding hole arranged through the top nozzle. Inside the top sleeve a guide sleeve is arranged which is insertable through that hole in the top nozzle which corresponds to the respective top sleeve. A locking sleeve is, in turn, arranged insertable into the guide sleeve for interlocking thereof in the top sleeve in connected position, that is, when the top nozzle is fixedly interlocked with the guide thimbles by means of the locking device.

The inside of the top sleeve is provided with an annular slot for cooperation with an outer bead arranged in the guide sleeve. In that end of the guide sleeve which faces the top sleeve, an axially extending slit is arranged and intended to allow compression of the guide sleeve into a diameter which allows inserting the bead into the internal slot of the top sleeve. For reliable interlocking of the locking sleeve to the guide sleeve, the locking sleeve, after insertion into the guide sleeve, may be provided with a bulge for cooperation with the rear side of the outer bead of the guide sleeve; alternatively, the locking sleeve is provided with bulges below the lower end of the guide sleeve, which lower end is arranged in the fuel assembly.

The disadvantage of the arrangement described above is that in those cases where the locking sleeve is not bulged for reliable interlocking, there is a risk that it gets out of position when inserting and withdrawing the control-rod guide thimbles. In those cases where the locking sleeve is provided with a bulge, the bulge is provided after the locking sleeve has become inserted into the guide sleeve, which means that the dimension of the bulge cannot be determined with certainty, and hence nor the interlocking force of the locking sleeve in the guide sleeve. In those cases where the locking sleeve is provided with bulges, a detached locking sleeve and guide sleeve, owing to the damage which arises during the detachment, must be discarded. A further disadvantage is that the location of the bulges described above at the lower part of the guide sleeve means that the locking sleeve must be drawn a relatively long distance in the axial direction to be released from the engagement with the guide sleeve.

SUMMARY OF THE INVENTION, ADVANTAGES

The present invention relates to a fuel assembly comprising a number of parallel fuel rods which are retained by means of spacer grids, arranged along the fuel rods, and guide thimbles for control rods or coolant. The guide thimbles are arranged between the fuel rods and fixed to the spacer grids. The guide thimbles with the associated fuel rods are fixed between a top nozzle and a bottom nozzle. The top nozzle has been provided with through-holes for connection of a top sleeve joined to the upper end of the guide thimbles.

Inside the top sleeve there is arranged a first locking element intended to cooperate with a second locking element arranged at the outer surface of a guide sleeve. The guide sleeve is insertable through a hole in the top place corresponding to the top sleeve.

For interlocking the guide sleeve, a locking sleeve is insertable into the guide sleeve. In this locking sleeve, according to the invention, an external, resilient third locking element is arranged for cooperation with an internal fourth locking element arranged in the guide sleeve.

By the invention the force required for detaching the locking sleeve from the guide sleeve is known since the extension of the third locking element in the radial direction is known. The resiliently shaped third locking element permits the guide sleeve, after detachment, to be reused. When arranging the third and the fourth locking element at the upper parts of the locking sleeve and the guide sleeve, respectively, the locking sleeve becomes disengaged after a relatively short distance of withdrawal, compared with known technique, where, in practice, the entire length of the sleeve must be withdrawn before it is released from its engagement with the guide sleeve.

BRIEF DESCRIPTION OF THE DRAWINGS

The invention will be most readily understood with reference to the accompanying drawings, wherein FIG. 1 schematically shows a fuel assembly with locking elements arranged in the top nozzle.

DESCRIPTION OF THE PREFERRED EMBODIMENTS

Figure 1:
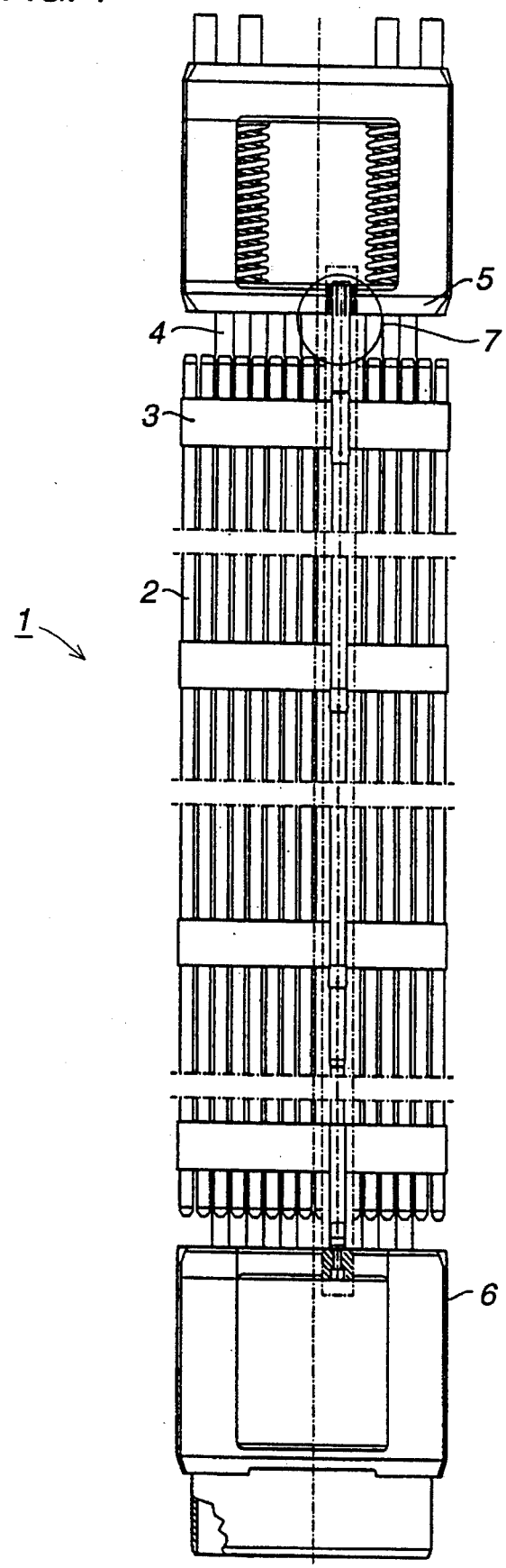

FIG. 1 shows a fuel assembly 1 composed of a large number of elongated fuel rods 2 which are retained by spacer grids 3. Between the fuel rods 2, guide thimbles 4 are arranged which are also kept in predetermined positions by the spacer grids 3. The guide thimbles 4 are somewhat longer than the fuel rods 2 and are adapted to extend somewhat above and somewhat below the ends thereof. The guide thimbles 4 are fixed to a top nozzle 5 and a bottom nozzle 6. A detail 7, showing the upper part of the attachment of a guide thimble 4 to the top nozzle 5, is shown enlarged in FIG. 2.

Figure 2:
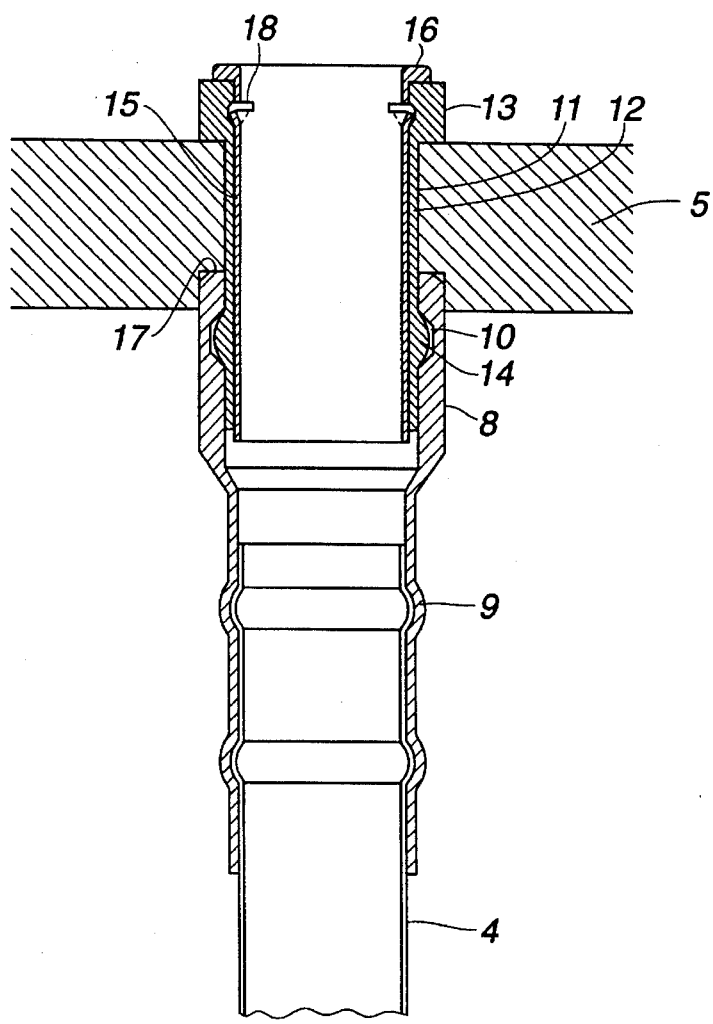
FIG. 2 shows an enlargement of the detail designated 7 in FIG. 1.

In FIG. 2, the upper end of the guide thimble 4 is joined to a top sleeve 8 by means of a number of beads 9. The upper end of the top sleeve 8 is provided on the inside with a first locking element in the form of a first internal slot 10. Through the top nozzle 5, a hole 11 is provided into which is inserted from above a guide sleeve 12 provided with a flange 13. The guide sleeve 12 is provided with a second locking element in the form of a bead 14 extending around the guide sleeve 12. The bead 14 is adapted, in mounted position, to fit into the first locking element that is, the first slot 10. A locking sleeve 15 with a flange 16 is adapted to be insertable from above into the guide sleeve 12. In the top nozzle 5, a seat 17 for receiving the top sleeve 8 is formed by the diameter of the through-hole 11 at the lower part of the hole 11 being larger than at the upper part thereof.

Figure 3:
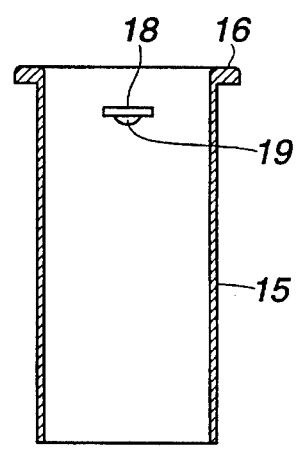
FIG. 3 shows a cross section of a locking sleeve which is turned through 90° in relation to the locking sleeve in FIG. 2.

FIG. 3 shows the locking sleeve 15 in cross section. The upper part of the locking sleeve 15, as shown in the figure, is provided with a third locking element in the form of a through-opening 18 arranged in the wall of the locking sleeve 15. A corbelled-out portion 19 is arranged in the lower edge of the opening 18 and extends in a direction from the centre of the locking sleeve 15. The opening 18 imparts resilient properties to the corbelled-out portion 19. The corbelled-out portion 19 is adapted to cooperate with a fourth locking element when the locking sleeve 15 is in the inserted position in the guide sleeve 12. The corbelled-out portion 19 may, of course, be arranged at any point along the edge of the opening 18.

Figure 4:
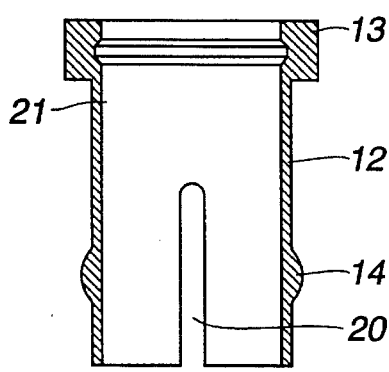
FIG. 4 shows a cross section of a guide sleeve.

FIG. 4 shows the guide sleeve 12 provided with a slit 20. The slit 20 imparts to the guide sleeve 12 resilient properties such that the guide sleeve with its external bead 14 can be inserted into the top sleeve 8. It is further shown that the guide sleeve 12 is internally provided with the fourth locking element in the form of an internal second annular slot 21 provided at the upper end of the guide sleeve.

Figure 5:
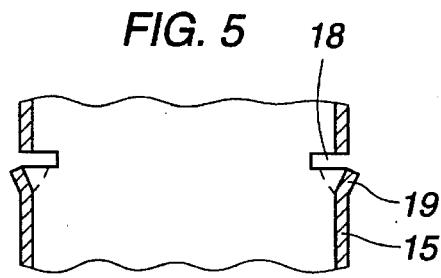
FIG. 5 shows in detail a third locking element arranged in a locking sleeve in a section according to FIG. 2.

FIG. 5 shows a detailed view of the third locking element 18, 19 arranged in the locking sleeve 15 in the same section as in FIG. 2. In FIGS. 2 and 5, the locking sleeve 15 is shown with two diametrically opposite openings 18 with corbelled-out portions 19. Preferably, two or three openings 18 are arranged with corbelled-out portions 19 separated from each other and along the wall of the locking sleeve 15.

Figure 6:
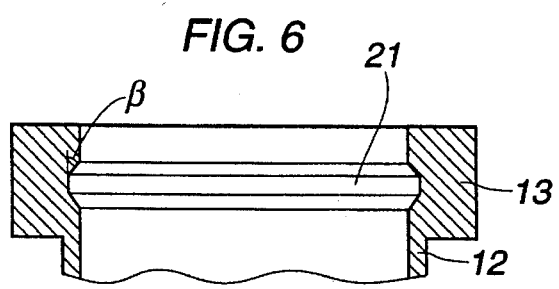
FIG. 6 shows in detail a fourth locking element arranged in a guide sleeve.

FIG. 6 shows a detailed view of the fourth locking element arranged in the guide sleeve 12. The upper and/or lower part of the annular slot 21 are/is made with an angle β, smaller than 90°, preferably 45°, with respect to the inner wall of the guide sleeve 12 to obtain a suitable interlocking force and a gentle detachment of the locking sleeve 15 from the guide sleeve 12. In those cases where the corbelled-out portion 19 in the locking sleeve 15 is arranged in the lower edge of the opening 18, at least the upper pare of the slot 21 in the guide sleeve 12 is arranged so as to form an angle β with the inner wall of the guide sleeve 12. In those cases where the corbelled-out portion 19 in the locking sleeve 15 is arranged in the upper edge of the opening 18, at least the lower part of the slot 21 in the guide sleeve 12 is arranged so as to form an angle β with the inner wall of the guide sleeve 12.

During mounting, the top nozzle 5 is arranged on the guide thimbles 4 such that the upper ends of the top sleeves 8 are guided towards the seats 17 in the holes 11. Then, the guide sleeve 12 is pressed down through the hole 11, whereby the guide sleeve 12 by the action of the slit 20 is sprung together so as to enable it to be passed into the hole 11 despite the external bead 14. The guide sleeve 12 is inserted so far that the bead falls down into the first slot 10. Then, the locking sleeve 15 is passed into the guide sleeve 12 so far that the corbelled-out edge 19 falls into the second slot 21, whereby the locking sleeve 15, the guide sleeve 12 and the top sleeve 8 are locked to each other.

In those cases where the fuel assembly 1 without mounted fuel rods 2 needs to be transported, the locking sleeve 15 is locked in the guide sleeve 12 only to such an extent that the fuel rods are kept together during the transport, that is, the locking sleeve 15 is inserted so far into the guide sleeve 12 that the corbelled-out portion 19 meets the upper end of the guide sleeve 12. This facilitates the detachment of the top nozzle 5 for inserting fuel rods at a later stage. After that, guide sleeves 12 and locking sleeves 15 are mounted according to the above.

When the top nozzle 5 is to be detached, for example for reconditioning of the fuel assembly 1, the locking sleeves 15 are first withdrawn from the guide sleeves 12 and then the guide sleeves 12 are withdrawn from the top sleeves 8. After that, the top nozzle 5 rests completely freely on the top sleeves 8 of the guide thimbles 4.

I claim:

1. A fuel assembly for a nuclear reactor, comprising a number of parallel fuel rods which are retained by means of spacer grids, arranged along the fuel rods, as well as guide thimbles, said guide thimbles being fixed to the spacer grids and the guide thimbles with the associated fuel rods being fixed between a top nozzle and a bottom nozzle, wherein through-holes are arranged in the top nozzle for connection to a top sleeve joined to the upper end of the respective guide thimble, wherein a first locking element is arranged in the top sleeve for cooperation with a second locking element arranged on a guide sleeve, wherein the guide sleeve is insertable through that hole in the top nozzle which corresponds to the respective top sleeve, and wherein the locking elements in connected position are interlocked by means of a locking sleeve insertable into the guide sleeve, wherein the locking sleeve includes a third locking element in the form of a through-opening arranged in the wall of the locking sleeve, wherein a corbelled-out portion is arranged in the edge of said opening, wherein said opening imparts to the corbelled-out portion resilient properties and wherein the corbelled-out portion, when the locking sleeve is inserted into the guide sleeve, is adapted to cooperate with a fourth locking element in the form of an annular slot arranged in the inner wall of the guide sleeve.

2. A fuel assembly according to claim 1, wherein the upper and/or lower part of the annular slot arranged in the guide sleeve forms an angle (β) smaller than 90° with the inner wall of the guide sleeve.

3. A fuel assembly according to claim 1, wherein the upper and/or lower part of the annular slot arranged in the guide sleeve forms an angle (β) which is 45° with the inner wall of the guide sleeve.

4. A fuel assembly according to claim 1, wherein the third locking element is arranged at the upper part of the locking sleeve and that the fourth locking element is arranged at the upper part of the guide sleeve.

\* \* \* \* \*